United States Patent
Browne et al.

(10) Patent No.: US 7,401,846 B2
(45) Date of Patent: Jul. 22, 2008

(54) VOLUME-FILLING MECHANICAL ASSEMBLIES AND METHODS OF OPERATING THE SAME

(75) Inventors: Alan L. Browne, Grosse Pointe, MI (US); Ching-Shan Cheng, Canton, MI (US); Nancy L. Johnson, Northville, MI (US); Gary L. Jones, Farmington Hills, MI (US); Scott R. Webb, Macomb Township, Macomb County, MI (US); Francis D. Wood, Detroit, MI (US); Ruth M. Gusko, Caro, MI (US); Chin-Hsu Lin, Troy, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 233 days.

(21) Appl. No.: 11/093,271

(22) Filed: Mar. 29, 2005

(65) Prior Publication Data

US 2005/0234139 A1    Oct. 20, 2005

Related U.S. Application Data

(60) Provisional application No. 60/559,249, filed on Apr. 2, 2004.

(51) Int. Cl.
*B60R 21/34* (2006.01)
(52) U.S. Cl. .................... 296/187.02; 296/187.03
(58) Field of Classification Search ........... 296/187.02, 296/187.09, 187.11, 187.12, 193.05, 193.06, 296/203.01, 204, 205, 209, 203.02, 203.03
See application file for complete search history.

(56) References Cited

U.S. PATENT DOCUMENTS

| | | | | |
|---|---|---|---|---|
| 3,339,673 A | * | 9/1967 | Schafer | 188/377 |
| 3,888,502 A | * | 6/1975 | Felzer et al. | 280/784 |
| 4,170,380 A | * | 10/1979 | Raitport | 296/68.1 |
| 5,454,589 A | | 10/1995 | Bosio et al. | 280/729 |
| 5,700,034 A | | 12/1997 | Lane, Jr. | |
| 5,715,757 A | * | 2/1998 | Dannawi et al. | 105/392.5 |
| 6,158,771 A | * | 12/2000 | Nusser et al. | 280/752 |
| 6,302,439 B1 | | 10/2001 | McCurdy | |
| 6,327,813 B1 | * | 12/2001 | Ishiwatari | 43/125 |
| 6,378,933 B1 | * | 4/2002 | Schoen et al. | 296/187.02 |
| 6,383,610 B1 | * | 5/2002 | Barz et al. | 428/192 |
| 6,471,285 B1 | * | 10/2002 | Czaplicki et al. | 296/187.02 |
| 6,575,526 B2 | * | 6/2003 | Czaplicki et al. | 296/187.02 |
| 6,702,366 B1 | | 3/2004 | Browne et al. | |
| 6,755,453 B2 | * | 6/2004 | Kellas | 293/128 |
| 6,874,831 B1 | * | 4/2005 | Pouget et al. | 293/115 |
| 6,877,795 B2 | * | 4/2005 | Browne et al. | 296/187.02 |
| 6,920,693 B2 | * | 7/2005 | Hankins et al. | 29/897.2 |
| 6,928,736 B2 | * | 8/2005 | Czaplicki et al. | 29/897.2 |
| 6,969,551 B2 | * | 11/2005 | Richardson et al. | 428/304.4 |
| 7,040,658 B2 | * | 5/2006 | Kellas | 280/751 |

(Continued)

FOREIGN PATENT DOCUMENTS

DE    44 25 830    5/1995

(Continued)

*Primary Examiner*—Dennis H. Pedder
*Assistant Examiner*—Greg Blankenship

(57) ABSTRACT

A volume-filling mechanical structure for modifying a crash or impact comprising a honeycomb celled material expandable from a compact state to a expanded state and methods for operating the same.

4 Claims, 6 Drawing Sheets

U.S. PATENT DOCUMENTS

| | | | |
|---|---|---|---|
| 7,077,460 B2 * | 7/2006 | Czaplicki et al. | 296/187.02 |
| 7,150,495 B2 * | 12/2006 | Fayt et al. | 296/187.02 |
| 2001/0048215 A1 | 12/2001 | Breed et al. | |
| 2003/0155753 A1 | 8/2003 | Breed | |
| 2004/0041418 A1 | 3/2004 | Kellas | |
| 2005/0218696 A1 | 10/2005 | Aase et al. | |
| 2005/0234139 A1 | 10/2005 | Browne et al. | |
| 2005/0234140 A1 | 10/2005 | Aase et al. | |
| 2006/0186701 A1 | 8/2006 | Browne et al. | |

FOREIGN PATENT DOCUMENTS

| | | |
|---|---|---|
| DE | 100 14 888 | 11/2001 |
| EP | 0 978 442 | 2/2000 |
| WO | WO 03/053749 A2 | 3/2003 |
| WO | WO/03/053749 A2 | 3/2003 |

* cited by examiner

VOLUME-FILLING MECHANICAL ASSEMBLIES AND METHODS OF OPERATING THE SAME

CROSS REFERENCE TO RELATED APPLICATIONS

The present application relates to, and claims priority to, U.S. Provisional Application Ser. No. 60/559,249 filed on Apr. 2, 2004, incorporated herein by reference in its entirety

BACKGROUND

The present disclosure generally relates to activation mechanisms for deployment of volume filling mechanical structures utilized for controlled impact energy management. The volume filling mechanical structures are volumetrically reconfigurable such as to occupy a small volume when in a dormant state and rapidly expand to a larger volume in a deployed state upon activation by the activation mechanism.

In addition to the energy-absorbing characteristics of a vehicle's structure, the vehicle may have various dedicated energy absorbing structures located internally or externally. Many devices are known to help dissipate energy and limit forces and decelerations on occupants/pedestrians experience in the event of a crash. In the vehicular arts, there are generally two types of such dedicated crash energy management structures: those that are passive, and those that are active.

An example of an energy absorbing structure that has been used in vehicles is an expanded honeycomb celled material, which is disposed in the expanded form within the vehicle environment. FIG. 1 illustrates a honeycomb celled material and its process flow for fabricating the honeycomb-celled material. A roll 10 of sheet material having a preselected width W is cut to provide a number of substrate sheets 12, each sheet having a number of closely spaced adhesive strips 14. The sheets 12 are stacked and the adhesive cured to thereby form a block 16 having a thickness T. The block 16 is then cut into appropriate lengths L to thereby provide so-called bricks 18. The bricks 18 are then expanded by physical separation of the upper and lower faces 20, 22, where adhesive strips serve as nodes to form the honeycomb cells. A fully expanded brick is composed of a honeycomb celled material 24 having clearly apparent hexagonally shaped cells 26. The ratio of the original thickness T to the expanded thickness T' is between about 1 to 10 to about 1 to 60. The honeycomb celled material is then used in fully expanded form within the vehicle environment to provide impact energy management and/or occupant protection (through force and deceleration limiting) substantially parallel to the cellular axis. As noted, because the honeycomb material is used in the fully expanded form, significant vehicular space is used to accommodate the expanded form, which space is permanently occupied by this dedicated energy management/occupant protection structure.

The expanded honeycomb celled material provides crash energy management parallel to the cellular axis at the expense of vehicular space that is permanently occupied by this dedicated energy management structure.

Typically, energy absorbing structures have a static configuration in which their starting volume is their fixed, operative volume, i.e. they dissipate energy and modify the magnitude and timing characteristics of the deceleration pulse by being compressed (i.e., crushing or stroking of a piston in a cylinder) from a larger to a smaller volume. Since these passive crash energy management structures occupy a maximum volume in the uncrushed/unstroked, initial state, they inherently occupy vehicular space that must be dedicated for crash energy management—the contraction space being otherwise unusable. Expressed another way, passive crash energy management structures use valuable vehicular space equal to their initial volume which is dedicated exclusively to crash energy management throughout the life of the vehicle.

One major category of active energy absorbing structures includes those that have a predetermined size that expands at the time of a crash so as to increase their contribution to impact energy management. One type of such a dedicated volume/size changing active energy absorbing structure is a stroking device, basically in the form of a piston and cylinder arrangement. Stroking devices can be designed so as to have low forces in extension and significantly higher forces in compression (such as an extendable/retractable bumper system) which is, for example, installed at either the fore or aft end of the vehicle and oriented in the anticipated direction of crash induced crush. The rods of such devices would be extended to span the previously empty spaces upon the detection of an imminent crash or an occurring crash (if located ahead of the crush front). This extension could be triggered alternatively by signals from a pre-crash warning system or from crash sensors or be a mechanical response to the crash itself. An example would be a forward extension of the rod due to its inertia under a high G crash pulse. Downsides of such an approach include high mass and limited expansion ratio (1 to 2 rather than the 1 to 10 to 1 to 60 possible with a compressed honeycomb celled material).

Another example of a volume/size changing active energy absorbing structure is an impact protection curtain. For example, a roll down shade or an inflatable curtain can be deployed to cover the window area and side structure of the vehicle.

Accordingly, there remains a need in the art for activation mechanisms for selectively deploying expandable energy absorbing devices used for impact attenuation, for structural reinforcement, and the like.

BRIEF SUMMARY

Disclosed herein are methods and activation mechanisms for deploying a volume filling mechanical structure suitable for use in energy management. In one embodiment, a volume filling mechanical assembly for a vehicle comprises an open celled material expandable from a non-expanded state to an expanded state, wherein the open celled material further comprises a first rigid end cap connected to one end of the open celled material and a second rigid end cap connected to an other end of the open celled material; and an activation mechanism regulating expansion of said open celled material from said non-expanded state to said expanded state in response to an activation signal, wherein the activation mechanism comprises an expansion agency interfaced with the first and second end caps.

A method of operating a volume filling structure comprises sensing an impact event; and expanding the volume filling structure from a non-expanded state to an expanded state upon the sensed impact event, wherein the volume filling structure comprises an open celled material, a first rigid end cap connected to one end of the open celled material and a second rigid end cap connected to an other end of the open celled material, and an activation mechanism regulating expansion of said open celled material from said non-expanded state to said expanded state in response to an activation signal, wherein the activation mechanism comprises an expansion agency interfaced with the first and second end caps.

In another embodiment, a method of stiffening and/or reinforcing a vehicle member comprises disposing a volume filling structure within a vehicle member, wherein the volume filling structure is in the unexpanded state; and expanding the volume filling structure within the vehicle member, wherein expanding the volume filling structure is stiffens and/or reinforces the vehicle member.

The above described and other features are exemplified by the following figures and detailed description.

BRIEF DESCRIPTION OF THE DRAWINGS

Referring now to the figures, which are meant to be exemplary embodiments, and wherein the like elements are numbered alike.

DETAILED DESCRIPTION

The present disclosure provides methods and apparatuses for activation of energy management structures. The energy management structures generally comprise an expandable volume-filling mechanical structure for both vehicle crash energy management and occupant/pedestrian protection applications. Advantageously, the expandable volume-filling mechanical structure, also referred to herein as the energy absorbing device, effectively absorbs the kinetic energy associated with an impact. As will be further described herein, suitable applications utilizing the energy absorbing device within or about a vehicle environment include, but are not intended to be limited to, crash energy dissipation, load path creation, modification of a vehicle deceleration pulse, local stiffening or reinforcement of the vehicle structure, stiffening or reinforcing closed section members subject to lateral loading, pedestrian impact protection, occupant protection, vehicle compatibility during impact events, crash protection to vulnerable components, e.g., fuel tank, interior passenger compartment, and the like.

Figure 1:
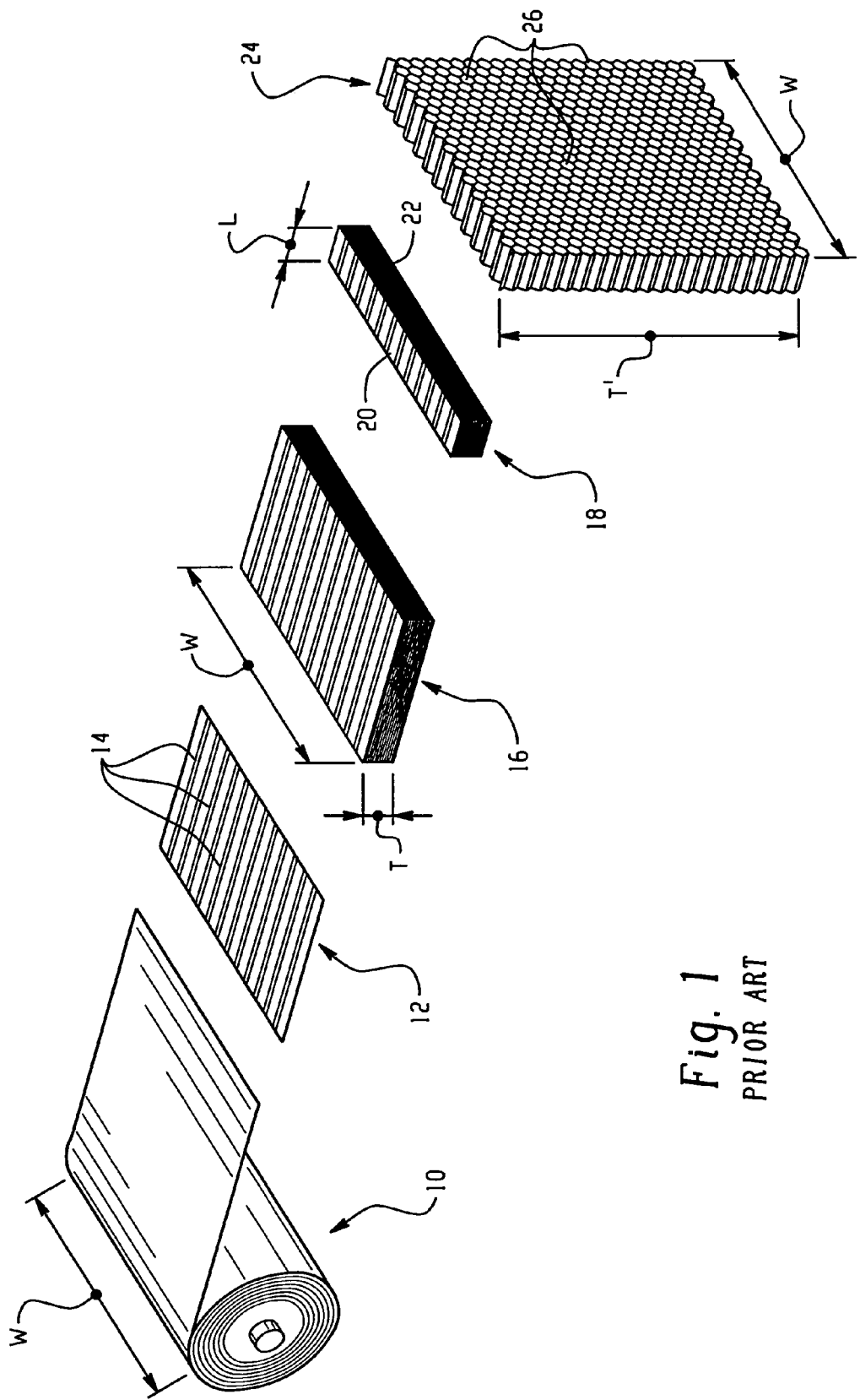
FIG. 1 is a perspective view of a manufacturing process to provide prior art honeycomb celled material.

In a preferred embodiment, the volume-filling mechanical structure device of the present disclosure comprises a before expansion open celled material brick, wherein expansion of the open celled material brick is in a plane transverse to the cellular axis of the cells thereof, and crash crush is intended to be parallel to the cellular axis. The open celled material is unexpanded in the sense that it is substantially fully compressed perpendicular to the longitudinal axis of its cells and parallel to the direction in which it is to be deployed. By way of example and for ease of understanding, reference will be made herein to a honeycomb shaped open celled material such as that shown in prior art FIG. 1.

The honeycomb brick occupies anywhere from approximately 1/10th to 1/60th of the volume that it assumes when in it is fully expanded (the expansion ratio) into an expanded honeycomb celled material (expanded honeycomb), depending on the original cell dimensions and wall thicknesses. Honeycomb cell geometries with smaller values of the expansion ratio in general deliver larger crush forces, and the choice of the honeycomb celled material is dependent upon the crush force (stiffness) desired in a particular application (i.e., softer or harder metals or composites). Expanded honeycomb celled materials provides adequate energy absorbing capabilities, but generally parallel to the cellular axis, as discussed hereinabove.

In a preferred embodiment, the open celled (e.g., honeycomb) material comprises a metallic material. The open celled material may also comprise other suitable non-metallic material such as nylon, cellulose, and other materials. The material composition and geometries of the open cells will be determined by the desired application.

Figure 2:
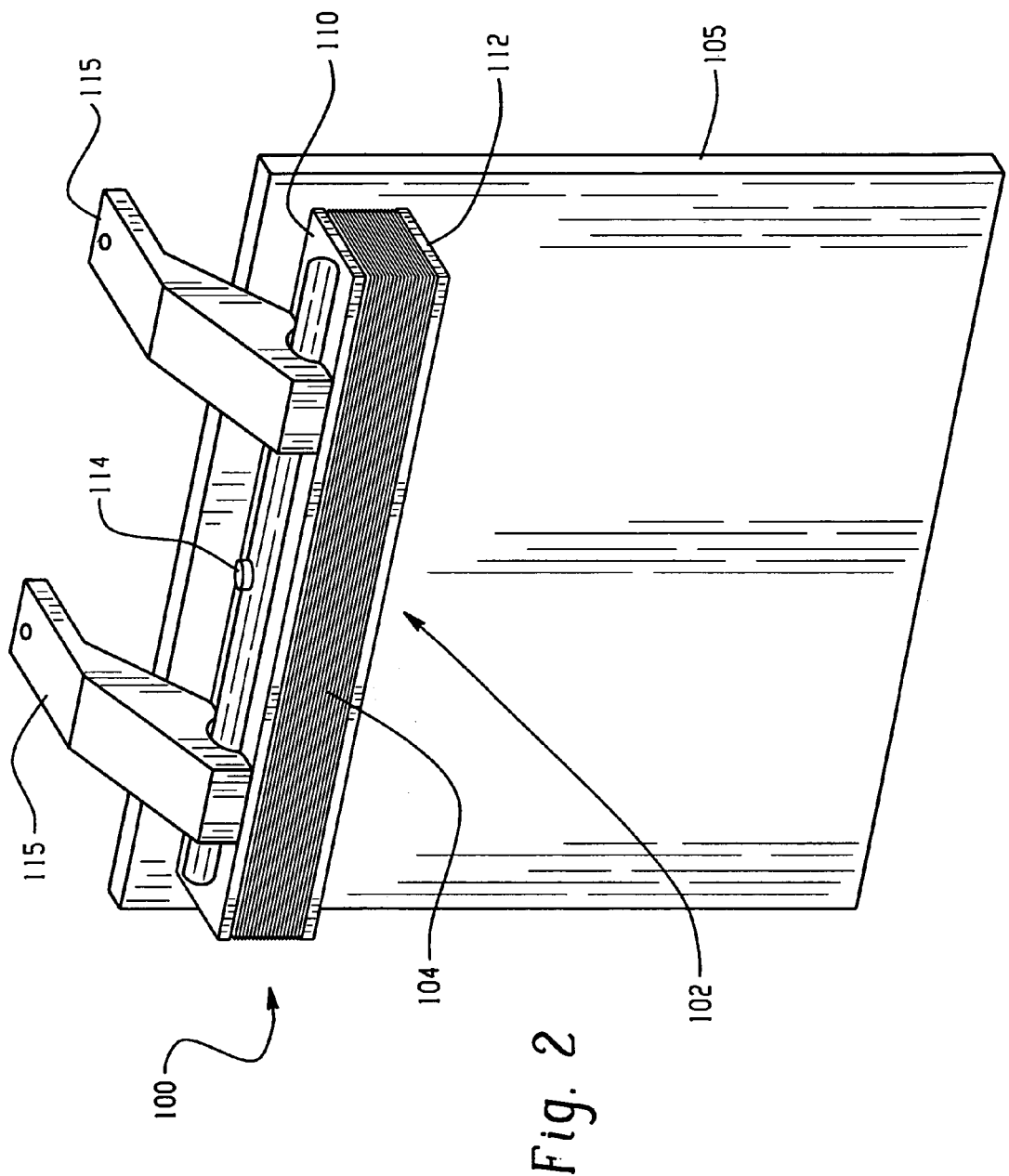
FIG. 2 is a perspective view of an energy absorbing device comprising compressed honeycomb cellular material in accordance with the present disclosure, shown prior to expansion (stored state)
Figure 3:
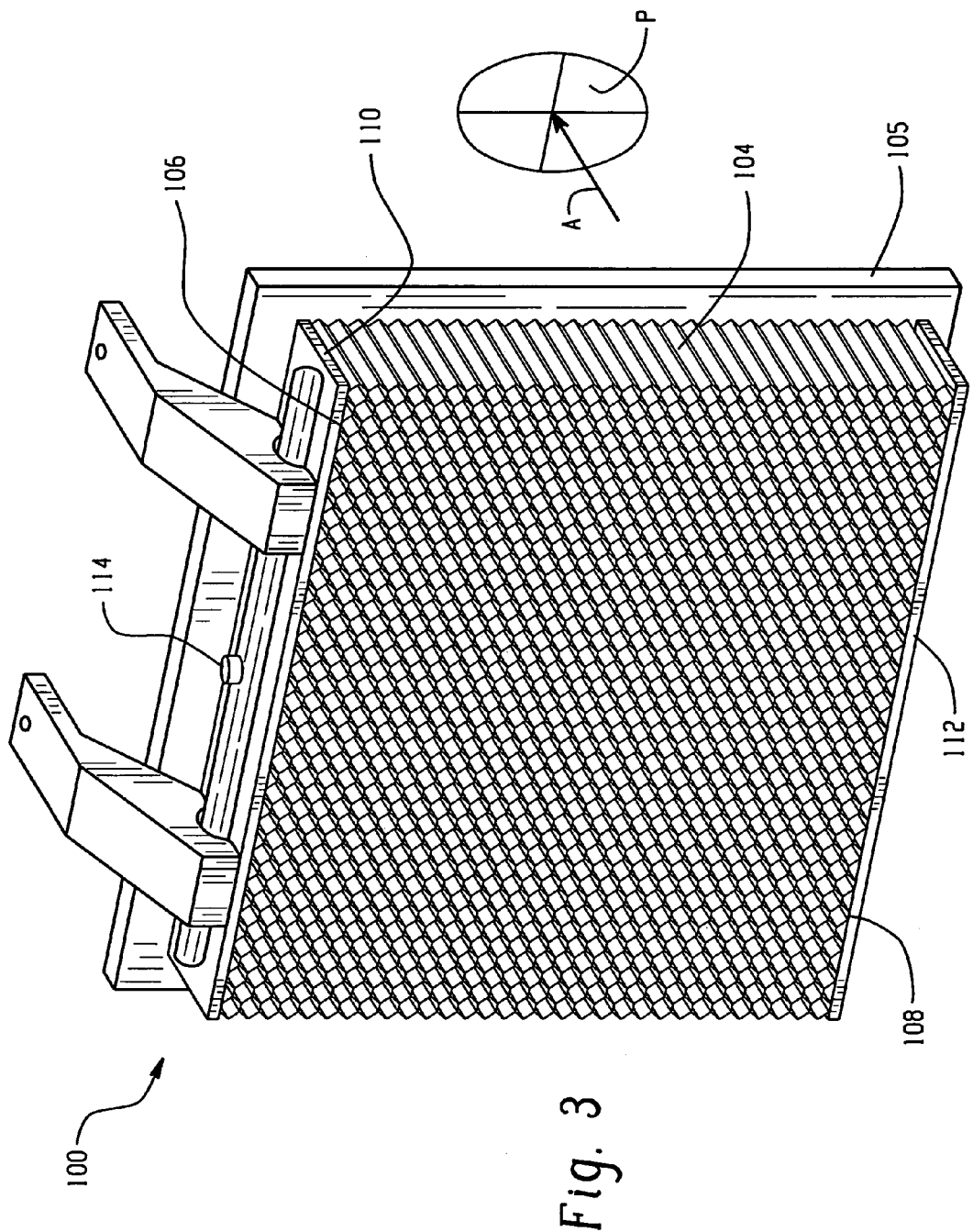
FIG. 3 is a perspective view of the energy absorbing device of FIG. 2 comprising expanded honeycomb cellular material in accordance with the present disclosure, shown in an expanded (deployed) state.

Turning now to FIGS. 2 and 3, perspective views of an exemplary volume-filling mechanical structure 100 of the present disclosure, shown prior to and upon expansion. Although FIG. 3 illustrates expansion of the assembly as having a generally square shape, other shapes are contemplated and are constrained only by the location of the device within the vehicle. For example, an arcuate profile may be effected for deployment within a wheel well. In the illustrated embodiment, a honeycomb celled material 104 is provided, such as for example, the material prepared according to a method of manufacture as discussed hereinabove. The honeycomb celled material 104 is initially stowed in a compact brick-like configuration as generally shown by reference number 102. Attached (such as for example by an adhesive) to the upper and lower faces 106, 108 of the honeycomb brick 102 are respective end caps 110, 112. The end caps 110, 112 are rigid and serve as guide members for defining the configuration of the honeycombed cell material 104 between a stored state as shown at FIG. 2 and a deployed state as shown at FIG. 3.

The end caps 110, 112 need not necessarily be planar. Indeed, they do not need to have the same shape or size. For example, the end caps 110, 112 may comprise a shape that compliments the area within the vehicle where the assembly 100 is located, such as a curved or a slanted shape orientation. For example, for expansion into a narrowing wedge shaped space, the end cap which moves as the honeycomb celled material expands may be shorter than the stationary end cap, so that the expanded honeycomb celled material has a complimentary wedge shape.

The volume-filling mechanical structure 100 preferably further comprises an optional support surface 105. Generally, the energy absorbing capacity of the assembly 100 is adequate to attenuate impact severity when the honeycomb material 104 expands along at least one support surface 105 to prevent the expanding honeycomb from flexing out of the way by stretching in plane through further expansion. As such, the assembly 100 may be employed in applications wherein a support surface is naturally available, and the honeycomb material 104 is situated to expand along this surface to provide suitable expansion of the honeycomb material 104. This includes impact between a pedestrian and vehicle, and between vehicle occupants and portions of the vehicle interior such as instrument panel, door interior, header, roof rails and pillars.

Additionally, in applications in which there may be occupant/pedestrian impact directly against the expanded honeycomb cellular structure 104 or other uneven structure, there may be a deployable front surface shield or screen (not shown) to provide a smoother surface for interaction with the occupant/pedestrian than is offered by the structure 103 itself. The shield is comprised of any of a variety of suitable flexible materials known to those skilled in the art.

The activation mechanism, shown generally at reference numeral 114, is operably connected to the end caps 110, 112. The activation mechanism 114 controls the state of the honeycomb-celled material such that, when activated, an expansion from the compact state to the expanded state occurs. This expansion is necessarily rapid if in response to pre-crash and/or crash triggering. One or more installation brackets 115 may be connected to one of the end caps 110, 112 for securing one end of the volume-filling mechanical structure 100 to a selected position within the motor vehicle. The brackets 115 can be secured by any means, e.g., bolts, welding, and the like, and may take any shape, form, and/or configuration.

Figure 4:
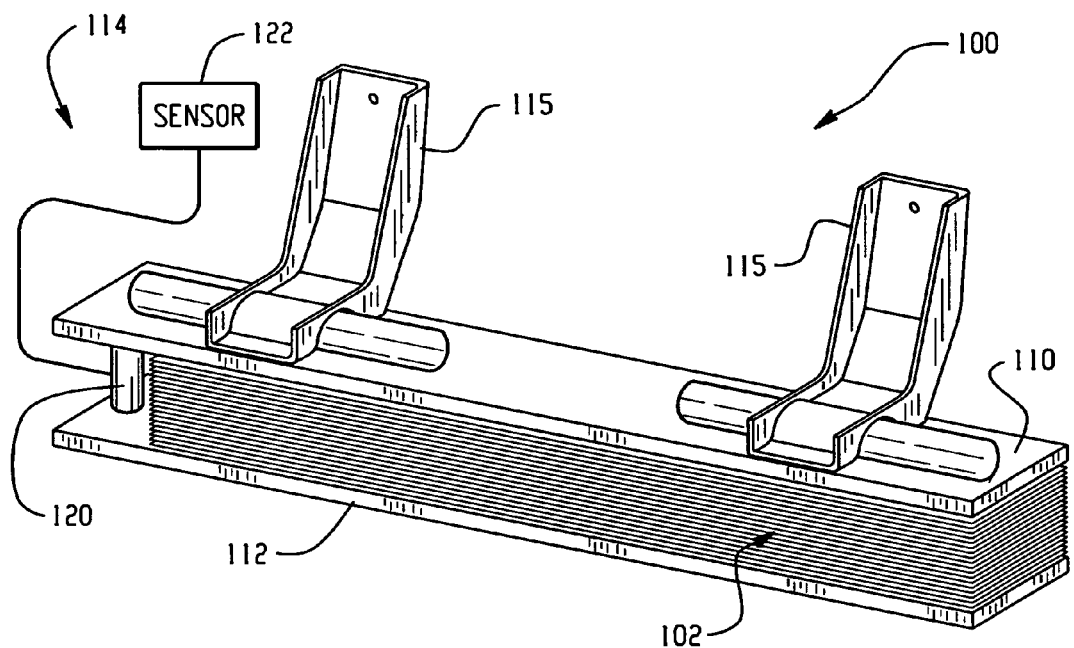
FIG. 4 is a perspective view of the energy absorbing device of FIG. 2 with an activation mechanism in accordance with a first embodiment.

Referring now to the drawings, FIGS. 4 through 9 depict various embodiments of suitable activation mechanisms 114 for deploying the volume-filling mechanical structure 100. In FIG. 4, the activation mechanism 114 utilizes a direct pyrotechnic deployment device 120. In general, it is noted that pyrotechnic deployment devices 120 as disclosed herein are generally irreversible and involve the ignition of an explosive charge. In this embodiment, the pyrotechnic deployment device 120 is cylindrically shaped as shown and is disposed intermediate end caps 110, 112. One or more of these pyrotechnic deployment devices 120 can be employed. In this manner, activation of the pyrotechnic device 120, i.e., detonation of the explosive charge, forcibly separates endplate 112 from the opposing endplate 110, thereby causing expansion of the honeycomb material 104. Moreover, since one of the end caps is fixedly attached to a stationary surface via brackets 115 or the like, deployment and subsequent expansion of the honeycomb celled material can be controlled. In a preferred embodiment, the pyrotechnic device 120 is in triggering communication with a sensor 122, e.g., a crash sensor, a pre-crash sensor, or the like, or alternatively, an output signal from a control module (not shown) operating with embedded deployment logic that utilizes the signal from the sensor 122. Pre-crash sensors are suitable if programmed to eliminate false detects, although means are possible for resetting the device 120 in the case of an unwanted deployment, which would consist of, at a minimum, replacement of the explosive charge plus recompression of the now deployed and expanded honeycomb celled material. Preferably, the volume-filling mechanical structure 100 would be replaced rather then restored to its dormant state. The location of the pyrotechnic device is not intended to be limited to the location as shown and will generally depend on the desired deflection angle of the honeycomb celled material 104.

Alternatively, an indirect pyrotechnic deployment means can be employed to provide momentum transfer energy sufficient to deploy the volume-filling mechanical structure 100. The sensor 122 provides a signal to the pyrotechnic device 120 to explode a pyrotechnic charge that propels a member (not shown) against a portion of the endcap 112, thereby causing expansion of the honeycomb celled material 104.

Figure 5:
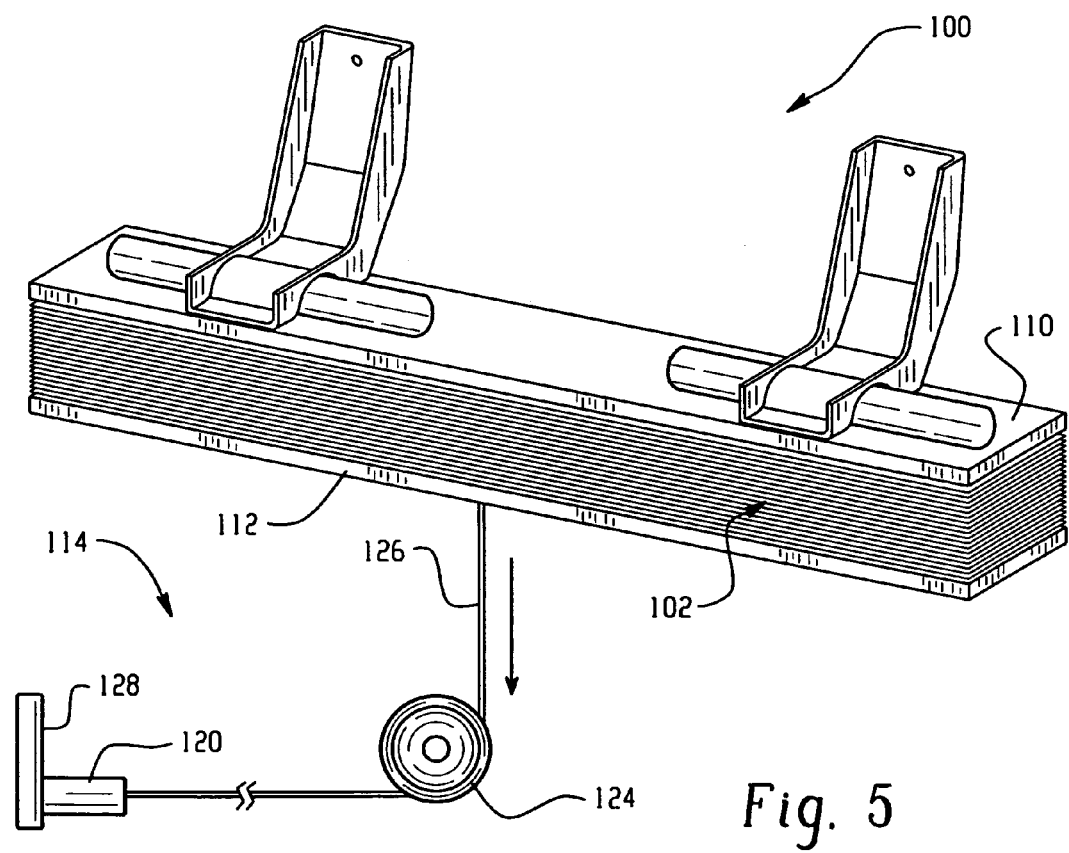
FIG. 5 is a perspective view of the energy absorbing device of FIG. 2 with an activation mechanism in accordance with a second embodiment.

FIG. 5 illustrates another such indirect pyrotechnic deployment means that employs an interconnecting flexible tether 126 to facilitate expansion. The interconnecting tether 126 is bound at one end to rigid end cap 112 and is bound at the other tether end to a mass 128, which is attached to pyrotechnic device 120. The pyrotechnic device 120 is in operative communication with the mass 128 such that, upon actuation, the mass 128 exerts a force on the tether 126 and causes endcap 112 to rapidly pull away from the other endcap 110, thereby resulting in expansion of the honeycomb celled material 104. Activation of the pyrotechnic device 120 is preferably with a signal from the sensor 122 as previously described. Optionally, one or more pulleys 124 are disposed on a surface spaced apart from and opposing the endcap 112, wherein the volume-filling mechanical structure 100 is in its compacted form and the tether 126 is in operative communication with the pulley 124. The mass 128 is attached to one end of the tether as previously described and is in operative communication with the pyrotechnic device 120 such that activation of the device 120 propels the mass 128 causing movement of the tether attached to endcap 112, thereby expanding the honeycomb cell material 104. The mass and path associated with its momentum are preferably offset from the path of the expandable honeycomb celled material 104. This embodiment provides increased versatility in the location within the vehicle of the volume-filling assembly 100. For example, the volume-filling assembly can be located within one portion of the vehicle whereas the mass 128 and pyrotechnic device 120 can be located at a different location within the vehicle.

Electrohydraulic and/or electromechanical devices in place of the pyrotechnic device 120 (such as a motor driven screw drive) could also be directly used to cause the expansion of the honeycomb material.

Figure 6:
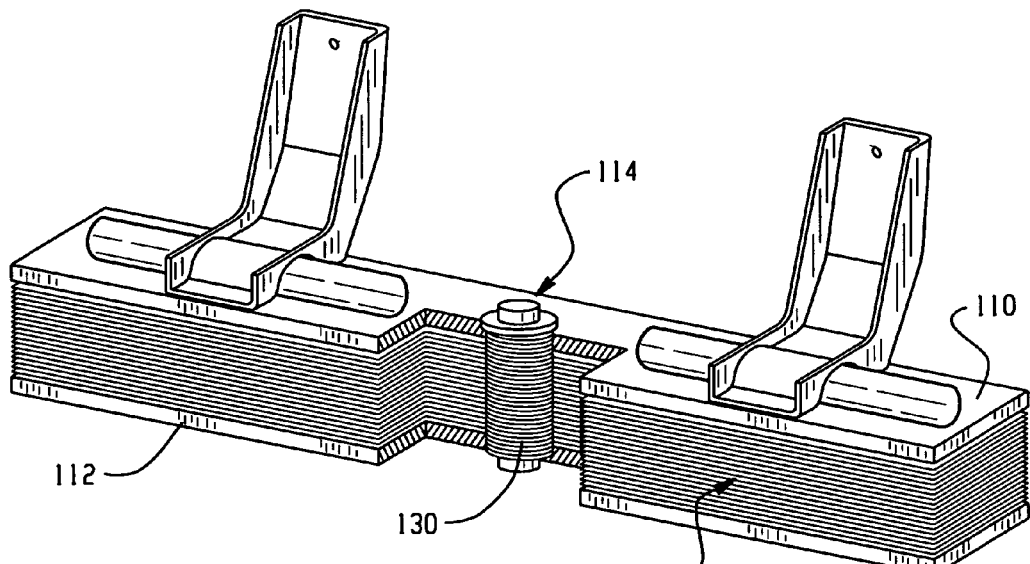
FIG. 6 is a perspective view of the energy absorbing device of FIG. 2 with an activation mechanism in accordance with a third embodiment.
Figure 7:
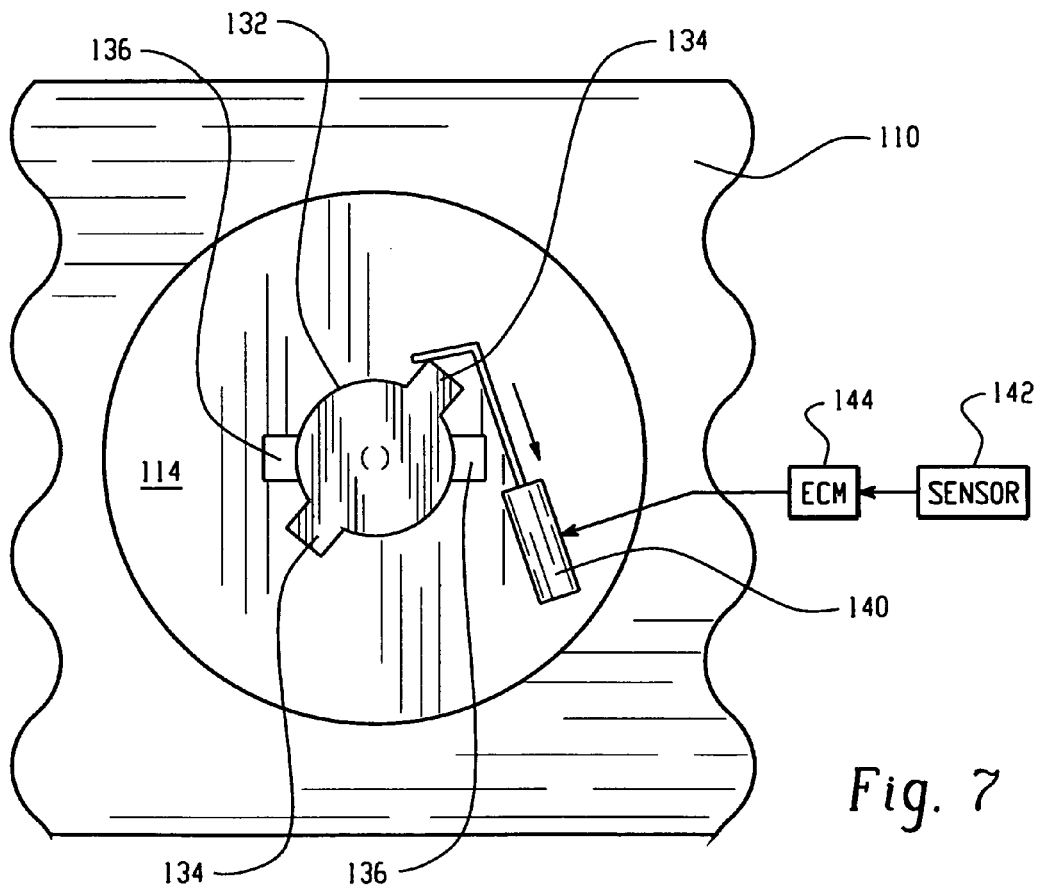
FIG. 7 is top plan view of an activation mechanism in accordance with a fourth embodiment.

In another embodiment, the activation mechanism 114 as shown in FIGS. 6 and 7 is employed to irreversibly trigger or actuate the volume-filling mechanical assembly 100. An expansion agency in the form of a highly compressed spring 130 is abuttingly situated between end caps 110, 112. The spring 130 is held highly compressed when the honeycomb celled material 104 is in the stowed (compact) configuration. As shown more clearly in FIG. 7, in one embodiment, the activation mechanism 114 includes a disk 132 which is rotatably mounted to the end cap 110, wherein the disk 132 has a pair of opposed fingers 134 which are receivable by a pair of opposed slots 136 formed in the end cap 110. A trigger includes an active material based actuator 140, which effects selective rotation of the disc 130. The active material based actuator 140 is triggered by a signal from a crash sensor 142, which signal is interpreted by an electronic control module 144, which in response sends an activation signal to the active material based actuator 140. In this manner, the activation signal to the active material based actuator 140 causes rotation of the disk 132 so as to cause the fingers 134 to fall into the slots 136 and thereupon the spring 130 to rapidly decompress. Other expansion agencies besides a compressed spring may include a pyrotechnic device or a pressurized air cylinder, for example. Alternatively, the activation mechanism may be passive and mechanically triggered by a crash due to crash induced movement of vehicle components.

As used herein, the term "active material" as used in reference to the active material based actuator 140 as used herein refers to several different classes of materials all of which exhibit a change in at least one attribute such as dimension, shape, and/or flexural modulus when subjected to at least one of many different types of applied activation signals, examples of such signals being thermal, electrical, magnetic, mechanical, pneumatic, and the like. One class of active materials is shape memory materials. These materials exhibit a shape memory effect. Specifically, after being deformed pseudoplastically, they can be restored to their original shape in response to the activation signal. Suitable shape memory materials include, without limitation, shape memory alloys (SMA), ferromagnetic SMAs, and shape memory polymers (SMP). A second class of active materials can be considered as those that exhibit a change in at least one attribute when subjected to an applied activation signal but revert back to their original state upon removal of the applied activation signal. Active materials in this category include, but are not limited to, piezoelectric materials, electroactive polymers (EAP), magnetorheological fluids and elastomers (MR), electrorheological fluids (ER), electrostrictive polymers, ionic polymer gels, composites of one or more of the foregoing materials with non-active materials, combinations comprising at least one of the foregoing materials, and the like.

Of these active materials, preferred active material based actuators 140 are ferromagnetic SMA's, EAP's, and piezoelectrics because of their quick response/short actuation times. Less preferable because they are thermally activated and thus have greater actuation times are shape memory alloys. SMA actuators or the like may be in the form of a spring, wire, finger, hook, or similar form that has a mechanical response upon the application of or removal of heat. SMA actuators are generally operable in a single direction, although two-way shape memory alloys are available. The preferred source of heat to the shape memory alloy actuators is through the provision of electrical energy to the wire to create heat through the resistance of the SMA actuator itself.

Upon decompression of the spring 130, the end cap 112, in operative communication therewith, causes expansion of the honeycomb celled material 104. In this embodiment, the compressed spring, or the like, is usually not returned to its dormant state after it has been deployed absent significant mechanical intervention, e.g., having it reset by a mechanic.

Figure 8:
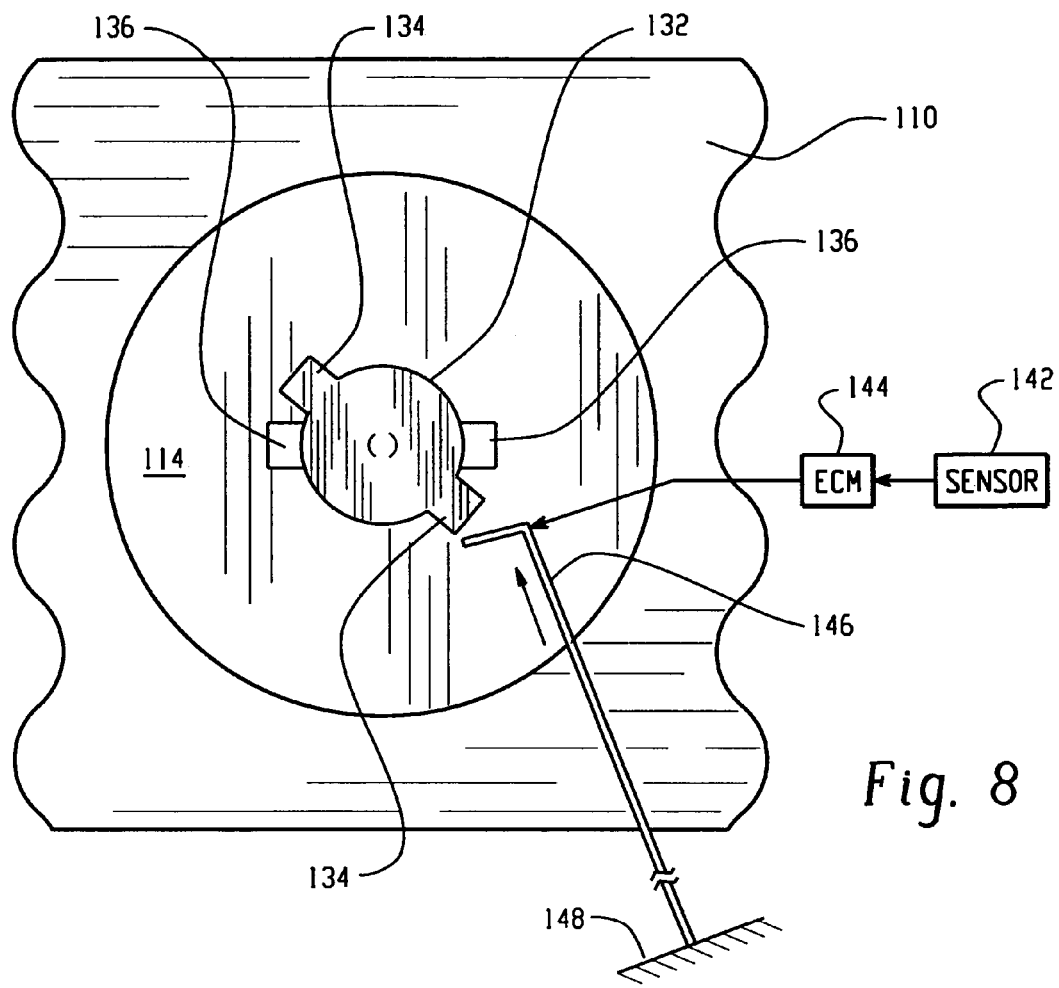
FIG. 8 is top plan view of an activation mechanism in accordance with a fifth embodiment.

In FIG. 8, the compressed mechanical spring 130 is used in conjunction with a passive mechanical means. In one embodiment, an interconnecting flexible link 146 is attached at one end to disc 132, which restrains compressed mechanical spring 130 in the highly compressed state as previously described and is attached at the other end to surface 148. Upon a crash force being exerted against the surface 148, a tension is created in interconnecting link 146, which effects rotation of restraining disc 130 to permit expansion of the compressed spring 130 and the honeycomb material 104. The latch for restraining spring 130 is not intended to be limited to any configuration. One of ordinary skill in the art will recognize that other latches can be activated by link 146 in view of this disclosure. For example, a simple L shaped latch can have one end of an upright portion pivotably attached to endcap 112 and a traverse member restraining the honeycomb material 104 and the compressed spring 130 by contact with end cap 110. Pivoting the upright portion removes contact of the traverse member and permits decompression of the spring. Pivoting can be effected by means of the link attached thereto. Advantageously, through gearing, a small displacement, e.g., crush of a lead portion of the vehicle, can be engineered to produce a large movement of the link with subsequent deployment of the honeycomb celled material 104.

In another embodiment, the compressed mechanical spring 130 can be actuated by means of a restraining clip or key. The clip or key would be removed by any one of the various means described above to allow concomitant expansion of the spring 130 and the honeycomb celled material 104. For example, the restraining clip or key may be removed by movement of the link, by an active material based actuator, by a solenoid, by a pyrotechnic device, by a pneumatic device, and the like.

Figure 9:
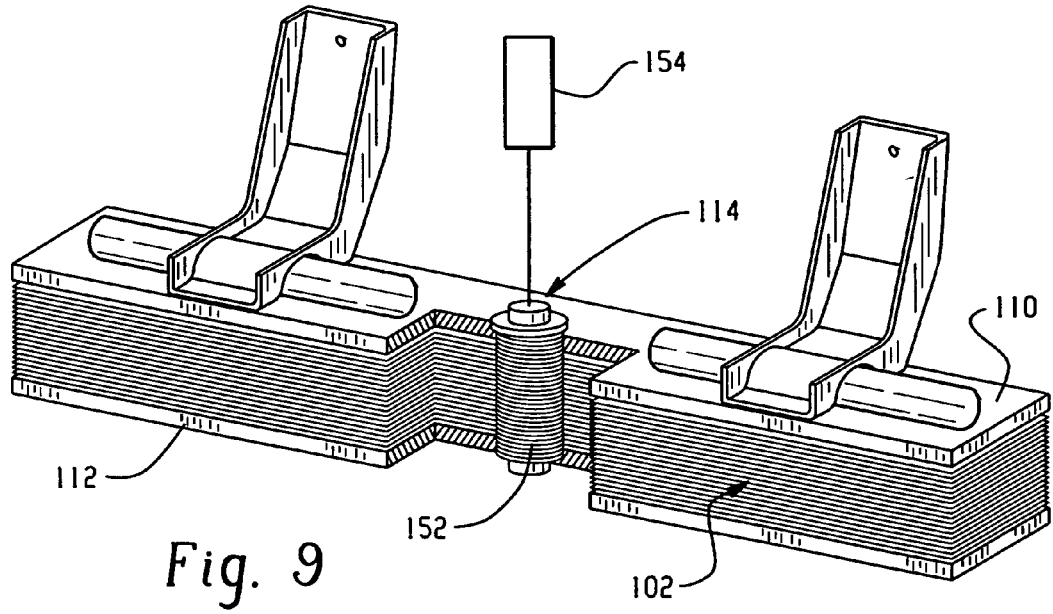
FIG. 9 is a perspective view of the energy absorbing device of FIG. 2 with an activation mechanism in accordance with a sixth embodiment.

FIG. 9 illustrates an embodiment of a direct activation mechanism 114 comprising a pneumatic device. The pneumatic device generally comprises an expandable conduit 152 extending from endplate 110 to endplate 112. One end of conduit 152 is in fluid communication with a fluid source 154; the other end is closed. An example of a suitable fluid source is a pressurized air source. Upon pressurization of conduit 152, the endplates 110, 112 separate, thereby causing expansion of the honeycomb celled material 104. The sensor 122 or 142, as previously described in reference to FIGS. 5 and 7, can be used to trigger release of the fluid, e.g., compressed air, from the fluid source 154.

Alternatively, pneumatic activation can occur by indirect means utilizing activation mechanisms similar to those previously described. For example, a tether, link, or mass can be pneumatically driven by compressed air, for example, to effect expansion of the honeycomb celled material 104. Likewise, an active material based actuator can be utilized to actuate the pneumatic device and cause subsequent expansion of the honeycomb celled material 104.

In another embodiment, a method of stiffening and/or reinforcing a vehicle member comprises disposing a volume filling structure within a vehicle member, wherein the volume filling structure is in the unexpanded state; and expanding the volume filling structure within the vehicle member, wherein expanding the volume filling structure is stiffens and/or reinforces the vehicle member. For example, the vehicle member can comprises a hollow rail structure, B-pillar, or the like. The volume filling structure can be disposed within the hollow structure, when desired, and then mechanically expanded to increase the stiffness or reinforce the strength of the vehicle member. For example, after welding operations and rust proofing, the volume filling structure can then be expanded.

It should also be noted that the various forces discussed above which are needed to directly or indirectly expand or assist in expanding the honeycomb celled material 104 to its deployed state is generally about less than 1 kilo Newton (kN). The honeycomb celled material 104 may expand at a broad range of rates of expansion for example from about 0.01 to about 15 meters per second (m/s). Very simple means of bonding rigid end caps 110 and 112 to honeycomb celled material 104 in its dormant state may be used such as, for example, a two part epoxy adhesive.

A reversible stored energy means of deployment may be returned to its dormant state after it has been deployed. Resetting of the means of deployment would involve resetting of the deployed honeycomb celled material 104 and a recharging or resetting of the stored energy device, e.g., recharging compressed air source, retraining of the active material, and the like, which could be done manually or alternatively, automatically. Whether an irreversible or a reversible embodiment is chosen is dependent upon the application and the means of sensing and control used to trigger deployment. Devices based on pre-crash sensors, because of the potential for false detects, with many existing sensors, might well be designed to be reversible but the devices should be non-intrusive and not affect vehicle functionality. There is less motivation for designing devices to be reversible whose deployment is based on crash sensing or indirectly by displacements caused by vehicle crush. The devices disclosed herein used for providing the means for deploying the volume-filling structure herein may be actuated by the sensing of an impending crash by pre-crash sensors. Stored energy means based on mechanical springs are less desirable than those based on compressed air as those based on compressed air, in contrast to those based on mechanical springs, are easily engineered to release the stored energy when not needed, which dramatically improves the safety of such devices. For example, in one embodiment, compressed air may be released when a vehicle is stopped and/or the ignition is turned off and then be automatically reintroduced when the vehicle is placed into gear or the ignition is turned on.

With regard to the active material based actuators, suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly (sodium 4-styrenesulfonate), poly(poly(vinylamine)backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric material can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Shape memory polymers (SMPs) generally refer to a group of polymeric materials that demonstrate the ability to return to some previously defined shape when subjected to an appropriate thermal stimulus. The shape memory polymer may be in the form of a solid or a foam as may be desired for some embodiments. Shape memory polymers are capable of undergoing phase transitions in which their shape is altered as a function of temperature. Generally, SMPs are co-polymers comprised of at least two different units which may be described as defining different segments within the copolymer, each segment contributing differently to the flexural modulus properties and thermal transition temperatures of the material. The term "segment" refers to a block, graft, or sequence of the same or similar monomer or oligomer units that are copolymerized with a different segment to form a continuous crosslinked interpenetrating network of these segments. These segments may be combination of crystalline or amorphous materials and therefore may be generally classified as a hard segment(s) or a soft segment(s), wherein the hard segment generally has a higher glass transition temperature (Tg) or melting point than the soft segment. Each segment then contributes to the overall flexural modulus properties of the SMP and the thermal transitions thereof. When multiple segments are used, multiple thermal transition temperatures may be observed, wherein the thermal transition temperatures of the copolymer may be approximated as weighted averages of the thermal transition temperatures of its comprising segments. With regard to shape memory polymer foams, the structure may be open celled or close celled as desired.

In practice, the SMPs are alternated between one of at least two shapes such that at least one orientation will provide a size reduction relative to the other orientation(s) when an appropriate thermal signal is provided. To set a permanent shape, the shape memory polymer must be at about or above its melting point or highest transition temperature (also termed "last" transition temperature). SMP foams are shaped at this temperature by blow molding or shaped with an applied force followed by cooling to set the permanent shape. The temperature necessary to set the permanent shape is generally between about 40° C. to about 100° C. After expansion by fluid, the permanent shape is regained when the applied force is removed, and the expanded SMP is again brought to or above the highest or last transition temperature of the SMP. The Tg of the SMP can be chosen for a particular application by modifying the structure and composition of the polymer.

The property of shape memory polymers most advantageous with regards to the deployment mechanisms described here-in is their dramatic decrease in modulus when heated above the glass transition temperature $T_g$ of their lower temperature constituent. This thus makes them eminently suited as latches (reverse actuators). At temperatures below $T_g$, they exhibit a higher modulus and can be physically positioned to block the release of stored energy such as that stored in a compressed spring. When heated above $T_g$ the SMP latch-blocking element becomes quite flexible causing the stored energy to be released.

The temperature needed for permanent shape recovery can generally be set at any temperature between about −63° C. and about 160° C. or above. Engineering the composition and structure of the polymer itself can allow for the choice of a particular temperature for a desired application. A preferred temperature for shape recovery is greater than or equal to about −30° C., more preferably greater than or equal to about 20° C., and most preferably a temperature greater than or equal to about 70° C. Also, a preferred temperature for shape recovery is less than or equal to about 250° C., more preferably less than or equal to about 200° C., and most preferably less than or equal to about 180° C.

Suitable shape memory polymers can be thermoplastics, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acids), polyanhydrides, polycarbonates, polyacrylates, polyalkylenes, polyacrylamides, polyalkylene glycols, polyalkylene oxides, polyalkylene terephthalates, poly-ortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methaciylate), poly(ethyl methacrylate), poly(butyl methacrylate), poly(isobutyl methacrylate), poly(hexyl methacrylate), poly(isodecyl methacrylate), poly(lauryl mnethacrylate), poly(phenyl methacrylate), poly(methyl acrylate), poly(isopropyl acrylate), poly(isobutyl acrylate) and poly(octadecylacrylate). Examples of other suitable polymers include polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly(ethylene terephthalate), polyethylene/nylon (graft copolymer), polycaprolactones-polyamide (block copolymer), poly(caprolactone) diniethacrylate-n-butyl acrylate, poly(norbomyl-polyhedral oligomeric silsequioxane), polyvinylchloride, urethane/butadiene copolymers, polyurethane block copolymers, styrene-butadienestyrene block copolymers, and the like.

Conducting polymerization of different monomer segments with a blowing agent can be used to form the shape memory polymer foam. The blowing agent can be of the decomposition type (evolves a gas upon chemical decomposition) or an evaporation type (which vaporizes without chemical reaction). Exemplary blowing agents of the decomposition type include, but are not intended to be limited to, sodium bicarbonate, azide compounds, ammonium carbonate, ammonium nitrite, light metals which evolve hydrogen upon reaction with water, azodicarbonamide, N,N' dinitrosopentamethylenetetramine, and the like. Exemplary blowing agents of the evaporation type include, but are not intended to be limited to, trichloromonofluoromethane, trichlorotrifluoroethane, methylene chloride, compressed nitrogen gas, and the like. The material can then be reverted to the permanent shape by heating the material above its Tg but below the highest thermal transition temperature or melting point. Thus, by combining multiple soft segments it is possible to demonstrate multiple temporary shapes and with multiple hard segments it may be possible to demonstrate multiple permanent shapes.

Suitable shape memory alloys generally exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the shape memory alloys are softer and more easily deformable in their martensitic phase and are harder, stiffer, and/or more rigid in the austenitic phase. In view of the foregoing properties, expansion of the shape memory alloy foam is preferably at or below the austenite transition temperature (at or below As). Subsequent heating above the austenite transition temperature causes the expanded shape memory alloy to revert back to its permanent shape. Thus, a suitable activation signal for use with shape memory alloys is a thermal activation signal having a magnitude to cause transformations between the martensite and austenite phases. For those shape memory materials that are ferromagnetic, a magnetic and/or a thermal signal can be applied to effect the desired change in shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing shape memory effects, superelastic effects, and high damping capacity.

It is the combination of large strain recovery (shape memory effect) and high actuation force that makes SMA's appropriate for the release of stored energy neede in many of the above deployment mechanisms.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape, changes in yield strength, and/or flexural modulus properties, damping capacity, superelasticity, and the like. Selection of a suitable shape memory alloy composition depends on the temperature range where the component will operate.

Suitable magnetic materials include, but are not intended to be limited to, soft or hard magnets; hematite; magnetite; magnetic material based on iron, nickel, and cobalt, alloys of the foregoing, or combinations comprising at least one of the foregoing, and the like. Alloys of iron, nickel and/or cobalt, can comprise aluminum, silicon, cobalt, nickel, vanadium, molybdenum, chromium, tungsten, manganese and/or copper.

Suitable MR fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron.

The particle size should be selected so that the particles exhibit multi-domain characteristics when subjected to a magnetic field. Diameter sizes for the particles can be less than or equal to about 1,000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils, paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

It is the change (dramatic drop) in shear strength of the MR fluid, when subjected to a canceling magnetic field generated by an electromagnet, that makes them suitable for use as the activation mechanism in a releasable on demand latch or other form of deactivatable blocking mechanism for stored energy.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like. It is the change in stiffness of the MR elastomer when subjected to a magnetic field that makes them suitable for a releasable on demand latch or blocking element for the stored energy.

Electroactive polymers include those polymeric materials that exhibit piezoelectric, pyroelectric, or electrostrictive properties in response to electrical or mechanical fields. An example of an electrostrictive-grafted elastomer with a. piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers of the present invention may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

It is the large strains and thus displacements possible with EAP's that make them well suited as actuators for releasing stored energy and in so doing deploying the open celled energy management devices.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A volume filling mechanical assembly for a vehicle, the assembly comprising:
    an open celled material expandable from a non-expanded state to an expanded state, wherein the open celled material further comprises a first rigid end cap connected to one end of the open celled material and a second rigid end cap connected to an other end of the open celled material; and
    an activation mechanism regulating expansion of said open celled material from said non-expanded state to said expanded state in response to an activation signal, wherein the activation mechanism comprises an expansion agency interfaced with the first and second end caps, and further comprising an active material based actuator adapted to selectively trigger an expansion of the expansion agency.

2. The volume filling mechanical assembly of claim 1, wherein the activation signal comprises one of a thermal activation signal, an electrical activation signal, a magnetic activation signal, a mechanical activation signal, and a pneumatic activation signal.

3. The volume filling mechanical assembly of claim 1, wherein the active material based actuator comprises a shape memory alloy, a ferromagnetic shape memory alloy, a shape memory polymer, a piezoelectric material, an electroactive polymer, a magnetorheological fluid or elastomer, an electrorheological fluids, an electrostrictive polymer, composites of one or more of the foregoing materials with non-active materials, and combinations comprising at least one of the foregoing materials.

4. A method of stiffening and/or reinforcing a vehicle member, comprising
    disposing a volume filling structure within a vehicle member, wherein the volume filling structure is in the unexpanded state; and
    expanding the volume filling structure within the vehicle member, wherein expanding the volume filling structure stiffens and/or reinforces the vehicle member; and
    wherein expanding the volume filling structure comprises attaching a tether to one end of the volume filling structure and manually exerting a force on the tether effective to expand the volume structure.

* * * * *